(12) United States Patent
Khosrowpour et al.

(10) Patent No.: US 12,047,234 B1
(45) Date of Patent: Jul. 23, 2024

(54) DATA TAGGING AND FEDERATION IN CLIENT-TO-EDGE NETWORKS

(71) Applicant: DELL PRODUCTS L.P., Round Rock, TX (US)

(72) Inventors: Farzad Khosrowpour, Pflugerville, TX (US); Nikhil Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/479,473

(22) Filed: Oct. 2, 2023

(51) Int. Cl.
*H04L 41/0813* (2022.01)
*H04L 41/34* (2022.01)

(52) U.S. Cl.
CPC .......... *H04L 41/0813* (2013.01); *H04L 41/34* (2022.05)

(58) Field of Classification Search
CPC ............................ H04L 41/0813; H04L 41/34
See application file for complete search history.

(56) References Cited

U.S. PATENT DOCUMENTS

| | | | | |
|---|---|---|---|---|
| 7,742,406 B1* | 6/2010 | Muppala | ................ | H04L 47/10 370/392 |
| 8,601,326 B1* | 12/2013 | Kirn | .................... | G06F 16/2365 714/26 |
| 11,184,267 B2 | 11/2021 | Iorga et al. | | |
| 2008/0136605 A1* | 6/2008 | Hunt | ................. | G06K 17/0022 340/286.02 |
| 2020/0067792 A1 | 2/2020 | Aktas et al. | | |

* cited by examiner

*Primary Examiner* — Michael A Keller
(74) *Attorney, Agent, or Firm* — Larson Newman, LLP

(57) ABSTRACT

A data communication network includes client systems and an edge device. The client systems each provide telemetry data to the data communication network, tags a first portion of the telemetry data with first metadata, and tags a second portion of the telemetry data with second metadata. The first metadata indicates that the first portion is passthrough data, and the second metadata indicates that the second portion is federatable data. The edge device receives the federatable data from each of the client systems, federates the federatable data into federated data, and provides the federated data. The federated data is of a smaller quantity than the received federatable data. The backend system receives the passthrough data from the client systems, receives the federated data from the edge device, analyzes the passthrough data and the federated data, and configures the data communication network based upon the analysis.

20 Claims, 2 Drawing Sheets

DATA TAGGING AND FEDERATION IN CLIENT-TO-EDGE NETWORKS

FIELD OF THE DISCLOSURE

This disclosure generally relates to information handling systems, and more particularly relates to data tagging and federation in client-to-edge use cases in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A data communication network includes client systems and an edge device. The client systems each provide telemetry data to the data communication network, tags a first portion of the telemetry data with first metadata, and tags a second portion of the telemetry data with second metadata. The first metadata indicates that the first portion is passthrough data, and the second metadata indicates that the second portion is federatable data. The edge device receives the federatable data from each of the client systems, federates the federatable data into federated data, and provides the federated data. The federated data is of a smaller quantity than the received federatable data. The backend system receives the passthrough data from the client systems, receives the federated data from the edge device, analyzes the passthrough data and the federated data, and configure the data communication network based upon the analysis.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, as needed or desired.

Figure 1:
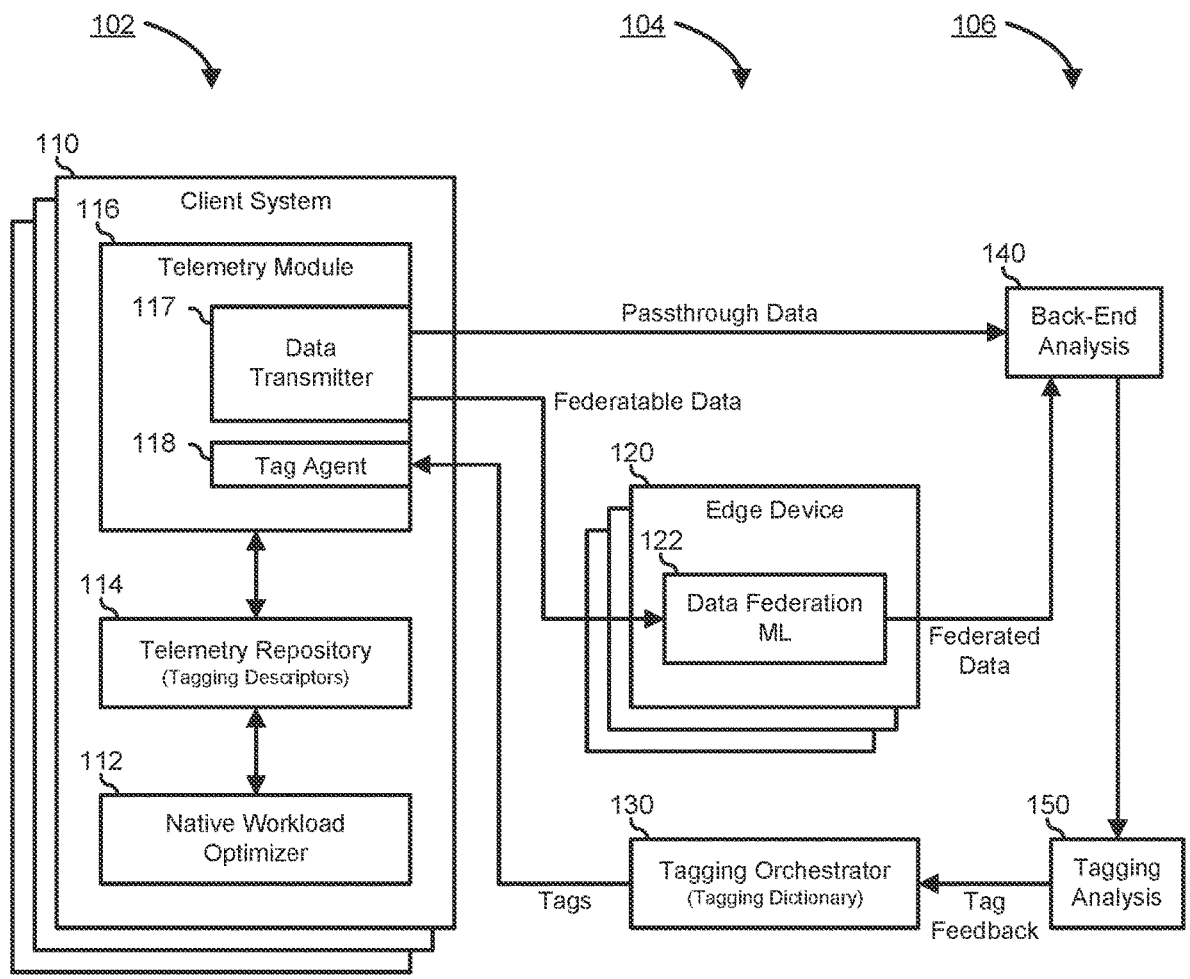
FIG. 1 is a block diagram of a data communication network according to an embodiment of the current disclosure.

FIG. 1 illustrates a distributed data communication network 100 including a client layer 102, an edge layer 104, and a backend 106. Data communication network 100 represents a communication network configured to provide data communication and processing services to users at a periphery of the data communication network. As the number of devices that are connected to the periphery of data communication networks increases, and as the processing needs of the connected devices increases, the operators of the data communication networks face greater and greater strains on the resources of the data communication networks, in terms of data communication bandwidth, processing power, processing efficiency, and the like. In particular, processing tasks that have typically been performed by the connected devices are increasingly being distributed to other processing nodes within the edge network and the processing backend. To track and manage the data communication bandwidth and traffic, and the distributed processing activities, of a data communication network, the operators typically monitor, manage, and maintain the data communication network to optimize the operations and to provide the best user service possible.

To this end, the operators of data communication networks typically employ data analysis tools in the backend of the network to evaluate and optimize the usage of the network. Such data analysis tools receive telemetry data from the connected devices and utilize artificial intelligence/machine learning (AI/ML) mechanisms to perform the evaluation and optimizations. The inventors of the current disclosure have identified several areas of critical importance in the evaluation and optimization of data communication networks. First, the delivery of the telemetry data may be subject to the transmission of redundant data, especially when similar data is provided by multiple connected devices. For example, an edge device may consume client data asynchronously from the time when the backend consumes that same client data, resulting duplicate copies of the same client data being transmitted on the data communication network. Second, the telemetry data is typically provided in addition to the normal data loads present on the data communication network, and thus the expanded use of telemetry data within the network presents a significant burden on the resources of the network in terms of bandwidth and power consumed, and reduced performance for the normal data.

Client layer 102 includes multiple client systems 110. Client systems 110 represent the devices that are connected at the periphery of data communication network 100. Client systems 110 provide a processing environment, such as a hosted operating system, a virtualized operating system such as a hypervisor or virtual machine manager, a containerized operating system, another type of operating system, or a combination thereof. The processing environment is utilized to perform processing tasks, such as applications, processes, utilities, or the like. The processing tasks can be standalone tasks that are completely performed within the host operating system and on hardware native to client systems 100, can be shared tasks where some portions of the tasks are performed on the client system and where other portions of the tasks are performed on one or more elements of edge layer 104 or backend 106, or can be tasks wholly executed on the edge layer or the backend, with only limited processing, such as handling of human interface device (HID) inputs and outputs, being performed by the client system.

To this end client systems 110 may be provided in various configurations and hardware architectures, as needed to perform the processing tasks or as desired by the operators of the various client systems, in addition to the common elements of the client systems as described below. The processing tasks may be understood to accommodate task-based data flows between client systems 110, edge layer 106, and backend 106. However for simplicity of illustration, such task-based data flows are omitted from the current figure. As used hereinafter, client systems 100 may be identified singularly as "client system 110," in reference to the common elements of the client systems.

Client system 110 includes a native workload optimizer 112, a telemetry repository 114, and a telemetry module 116. Native workload optimizer 112 operates to monitor the operations of the workloads instantiated on client system 110 and the operating conditions of the client system. Native workload optimizer 112 then operates to optimize the operating state of the workloads and operating conditions to achieve a particular goal, such as low-power operations, high-performance operations, battery-longevity operations, low-acoustics operations, or the like. Further, native workload optimizer 112 operates to provide telemetry information related to the operations of the workloads, the operating conditions, and the operating state to telemetry repository 114 for forwarding to the various elements of edge level 104 and backend 106, as described further below.

Edge layer 104 includes a number of edge devices 120 and a tagging orchestrator 130. Edge layer 104 represents a network of distributed processing devices that are configured to provide data transportation functions and processing functions, as needed or desired. The processing devices may be configured in a roughly geographical topology, with edge sub-layers that are located more proximate to client systems 110 constituting a near-edge, with edge sub-layers that are located somewhat more remotely from the client systems constituting a middle-edge, and with edge sub-layers that are located still more remotely from the client systems constituting a far-edge. In such a geographical topology, highly latency sensitive applications may be understood to be executed to greatest advantage on client system 110, while applications that are successively less latency sensitive may be executed at the near-edge, the middle-edge, or the far-edge. An example may be where client system 110 represents an automotive processing system, where vehicle critical functions such as engine control and vehicle safety may be operated on-vehicle, while vehicle-to-vehicle communications may be advantageously executed in the near-edge at a processing device that is proximate to the vehicle at the near-edge, and vehicle entertainment applications may be executed at more remote processing devices at the far-edge.

Backend 106 includes a backend analysis module 140 and a tagging analysis module 150. Backend 106 represents elements of data communication network 100 that are associated not with the data transportation functions and processing functions associated with edge layer 104, but rather with the overall management and distribution of the transportation functions and processing functions between client systems 110 and edge devices 120. Thus, while in a particular implementation, the elements of backend 106 may be provided by one or more processing device within edge layer 104, backend analysis module 140 and tagging analysis module 150 are illustrated as separate from the processing devices of the edge layer for the sake of simplicity of illustration, and may be included within the edge layer or within a dedicated backend, as needed or desired.

Returning to client systems 110, telemetry module 116 includes a data transmitter 117 and a tagging agent 118. Rather than simply passing all of the telemetry information from telemetry repository 114 to backend analysis module 106 as raw telemetry information, telemetry module 116 operates to tag the telemetry information with additional information that identifies each element of telemetry information as either "passthrough" data or "federatable" data. Passthrough data represents those elements of the telemetry data that are in some aspect unique, and therefore not subject to data traffic reduction, as described further below. In contrast, federatable data represents those elements of the telemetry data that are determined to be potentially redundant information, and therefore subject to data traffic reduction. The passthrough data is provided to backend analysis module 150, and the federatable data is provided to edge devices 120 for further processing as described below.

TABLE 1

Tagging Metadata

| Metadata class | Metadata Field | Tag Locality |
| --- | --- | --- |
| Data type | Trace, log, configuration, asset, service, etc. | TM |
| Data class | Device, persona, security, application, OS, remote object, etc. | TM |
| Data source | Physical, logical, virtual, etc. | TM plug-in |
| Data criticality | Critical events/logs (security, safety, health) - immediate and streaming processing | TM, Subscribers, Cloud |
| Data sensitivity | Sensitive data such as PII, face detection, fingerprint, audio may need encryption locally and during movement | TM, Subscribers |
| Data location | Geographical location and governance policies around data | TM, Cloud |
| Data consumer QoS demand | Latency, frequency of sampling, number of variables, expected volume of data (low, medium, high) | TM-registered consumer device |
| Data storage life | In action: interactive and non-persistent, interactive and persistent, one-way and non-persistent, one-way and | Policy |

TABLE 1-continued

Tagging Metadata

| Metadata class | Metadata Field | Tag Locality |
| --- | --- | --- |
| expectancy | persistent<br>At rest: Short, long | |
| Data usage level | Data frequency of use by total number of TM subscribers (low/medium/high)<br>Data access type: continuous, event (on behave of), async | TM |
| Data timestamp | Generated, modified | TM data sources |
| Target type | Peripherals, apps/containers, internal devices (CPU, GPU), services (predictive failure, remediation, sales) | TM, Subscribers |
| Current owner | Secure token/key identifying the local, distributed, cloud node(s) owning the data<br>Member of (a namespace) | TM-registered source starts the tag. As the data moves to edge/cloud/is updated, Owner is updated |
| Data purgability | Purgability data that provides privacy tagging for Large Language Model exclusion or exclusive handling in backend | TM, Subscribers, Cloud |

The telemetry data is tagged for manageability at the data source, and the tagging information may be modified as the telemetry data is passed through data communication network 100, as needed or desired. In this regard, tag agent 118 operates to implement various tagging policies as defined by telemetry repository 114 and tagging orchestrator 130, as described below. The telemetry data is tagged based upon tag fields shown above in Table 1. An example of passthrough data that is not federatable may be provided as:

Trace+Security+Container+At_Rest-Long+Internal Device+Client A @ Timestamp1, because a particular Trace event may be understood to be a one-time chunk of telemetry data that is associated with a particular unique set of circumstances on client system 110. On the other hand, an example of federatable data may be provided as:

Log+Persona+Logical_E3+Frequent+Non-Persistent+ App @ Timestamp2, because a log file at the common timestamp (e.g., Timestamp2) will be the same at any given time, and so, the passing of such telemetry data may be combined into a single federated data transmission.

In a particular embodiment, the telemetry data can be tagged with a purgability tag that identifies the telemetry data as being regarded as private data or that is otherwise specially handled by backend analysis module 140. For example, particular telemetry data may include privacy information that is required by regulation or statute to be maintained as private, and thus may not be incorporated in a Large Language Model (LLM) analysis or the like. Here, such telemetry data may be excluded from the LLM analysis, or may be otherwise purged of privacy information prior to the incorporation in the LLM analysis, as needed or desired.

Edge devices 120 include a data federation module 122 that operates to federate the federatable and tagged telemetry data from data transmitter 117, and to federate the data. That is, data federation module 122 evaluates the received telemetry data and evaluates the data and tagging information to determine an optimum aggregation of the federatable telemetry data to pass to backend analysis module 140. In analyzing the telemetry data and tagging information, data federation module 122 may utilize a machine learning (ML) model that determines the optimum aggregation for a particular operating mode. For example, the ML model may optimize for data bandwidth for the data transmitted on data communication network 100, for lowest latency of data transmission, for most energy efficient data transmission, for other policy-based considerations such as quality of service (QoS) on the data communication network, or a combination thereof, as needed or desired. In a particular embodiment, telemetry data from telemetry module 116 can be targeted to different particular devices of edge devices 120 based upon the tagging information.

The term "federatable" does not imply the presence on data communication network 100 of a data federation module 122 on any of edge devices 120. In a case where there are no edge devices with data federation modules, the tagged telemetry data is passed as passthrough data to backend analysis module 140, as needed or desired. However when a data federation module is present, then the data federation module 122 operates as a proxy and updates the ownership and timestamp for any modifications made to the data by the data federation module.

Backend analysis module 140 operates to analyze the telemetry data to optimize the operations of data communication network 100. The optimization of operations of a data communication network, and the associated placement of workloads, applications, and the like within an edge network or within client systems, is known in the art and will not be further described herein, except as may be needed to illustrate the current embodiments. For the purposes of the current disclosure, backend analysis module 140 operates to analyzed the types of telemetry data, including the passthrough data from client systems 110 and the federated data from edge devices 120, and to determine optimizations to the types of data that is identified as passthrough data and the types of data that is identified as federatable data. In particular, backend analysis module 140 passes the tagging information to tagging analysis module 150 for analysis. In this regard, backend analysis module 140 and tagging analysis module 150 may include one or more ML module that evaluates the tagging information and that optimizes the tagging scheme employed on data communication network 100, as needed or desired. layer 104

Tagging analysis module 150 provides tag feedback to tagging orchestrator 130. Tagging orchestrator 140 operates to monitor, manage, and maintain the tagging policies implemented on data communication network 100. For example, tagging orchestrator 130 includes a tagging dictionary that defines the tagging fields and tagging polices that are provided to tagging agent 118, as needed or desired.

Figure 2:
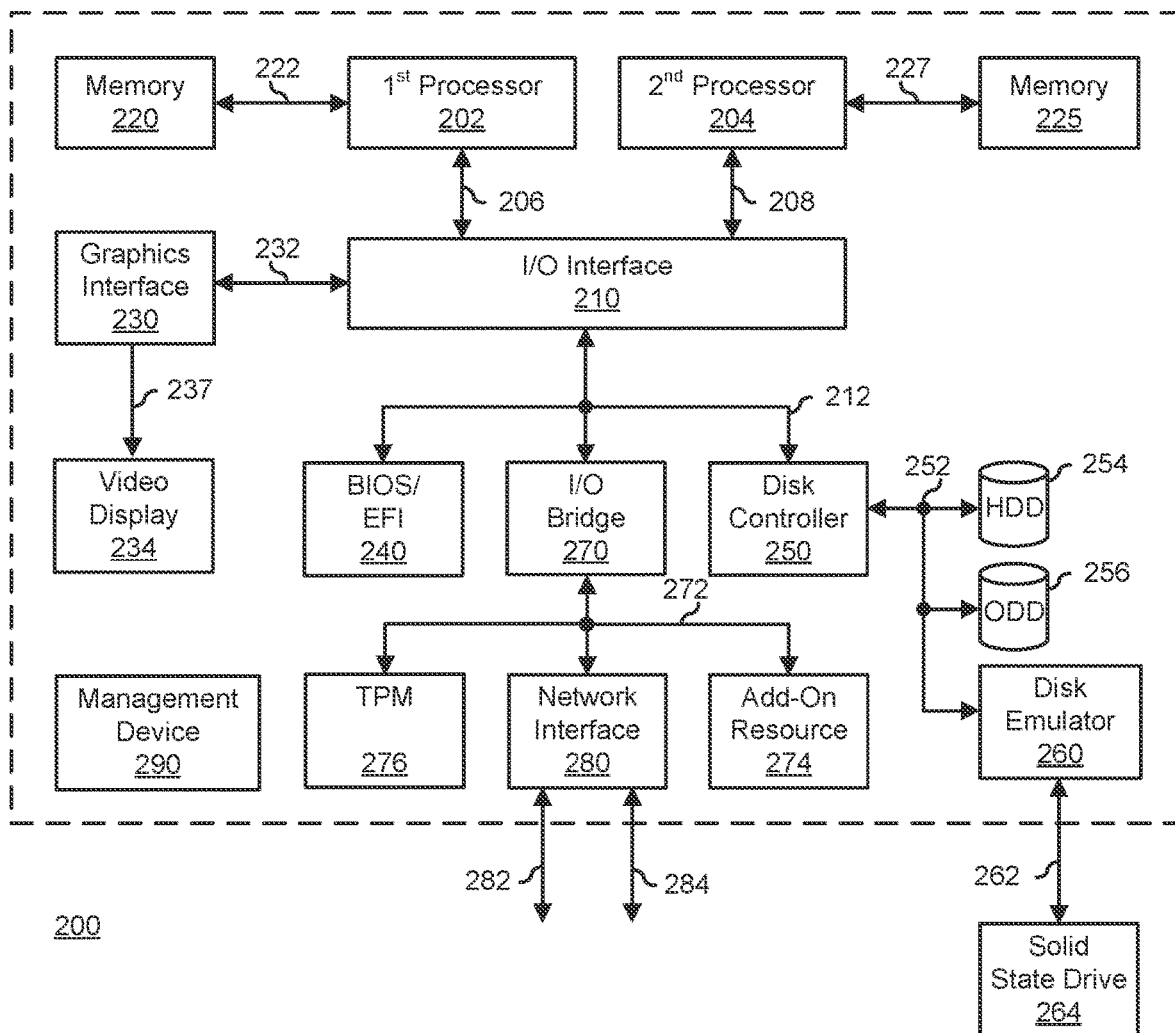
FIG. 2 is a block diagram illustrating a generalized information handling system according to another embodiment of the present disclosure.

FIG. 2 illustrates a generalized embodiment of an information handling system 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes a processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256, a disk emulator 260 connected to an external solid state drive (SSD) 264, an I/O bridge 270, one or more add-on resources 274, a trusted platform module (TPM) 276, a network interface 280, a management device 290, and a power supply 295. Processors 202 and 204, I/O interface 210, memory 220, graphics interface 230, BIOS/UEFI module 240, disk controller 250, HDD 254, ODD 256, disk emulator 260, SSD 264, I/O bridge 270, add-on resources 274, TPM 276, and network interface 280 operate together to provide a host environment of information handling system 200 that operates to provide the data processing functionality of the information handling system. The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 236 to a video display 234. In a particular embodiment, information handling system 200 includes separate memories that are dedicated to each of processors 202 and 204 via separate memory interfaces. An example of memories 220 and 225 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 2394 (Firewire) interface, a proprietary interface, or a combination thereof. Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 when peripheral interface 272 and the I/O channel are of the same type, and the I/O bridge translates information from a format suitable to the I/O channel to a format suitable to the peripheral channel 272 when they are of a different type. Add-on resource 274 can include a data storage system, an additional graphics interface, a network interface card (NIC), a sound/video processing card, another add-on resource, or a combination thereof. Add-on resource 274 can be on a main circuit board, on separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 when the information handling system is otherwise shut down. An example of management device 290 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data communication network, comprising:
    a plurality of client systems, each client system configured to provide telemetry data to the data communication network, to tag a first element of the telemetry data with first metadata, and to tag a second element of the telemetry data with second metadata, wherein the first metadata indicates that the first element is passthrough data, and wherein the second metadata indicates that the second element is federatable data;
    an edge device configured to receive the federatable data from each of the client systems, to federate the federatable data into federated data, and to provide the federated data, wherein the federated data is of a smaller quantity than the received federatable data; and
    a backend system configured to receive the passthrough data from the client systems and to receive the federated data from the edge device, to analyze the passthrough data and the federated data, and to configure the data communication network based upon the analysis.

2. The data communication network of claim 1, wherein the first metadata indicates that the first element of the telemetry data is generated uniquely by a first one of the client systems.

3. The data communication network of claim 2, wherein the second metadata indicates that the second element of the telemetry data is generated multiple times by the client systems.

4. The data communication network of claim 3, wherein the second element of the telemetry data includes telemetry data that is generated by multiple client systems.

5. The data communication network of claim 3, wherein the second element of the telemetry data includes telemetry data that is generated multiple times by a second one of the client systems.

6. The data communication network of claim 3, wherein, in federating the federatable data, the edge device is further configured to combine the multiple instances of the telemetry data into a common element of telemetry data.

7. The data communication network of claim 1, further comprising a tagging orchestrator configured to provide tagging information to the client systems, wherein the tagging information is based upon the analysis, and wherein the client systems tag the first and second elements based on the tagging information.

8. The data communication network of claim 1, wherein the tagging of the first element and the second element is based upon a condition of the telemetry data.

9. The data communication network of claim 8, wherein the condition includes at least one of a data type, a data class, a data source, a data criticality, a data sensitivity, a data location, a data consumer, a data usage, a target type, a current owner, and a data purgability.

10. The data communication network of claim 1, wherein the telemetry data is based on a workload distribution within the client systems.

11. In a data communication network having a plurality of client systems, a method comprising:

tagging a first element of telemetry data from the associated client system with first metadata, wherein the first metadata indicates that the first element is passthrough data;

tagging a second element of the telemetry data with second metadata, wherein the second metadata indicates that the second element is federatable data;

receiving, by an edge device of the data communication network, the federatable data from each of the client systems;

federating the federatable data into federated data, wherein the federated data is of a smaller quantity than the received federatable data;

receiving, by a backend system of the data communication network, the passthrough data from the client systems and the federated data from the edge device;

analyzing the passthrough data and the federated data; and configuring the data communication network based upon the analysis.

12. The method of claim 11, wherein the first metadata indicates that the first element of the telemetry data is generated uniquely by a first one of the client systems.

13. The method of claim 12, wherein the second metadata indicates that the second element of the telemetry data is generated multiple times by the client systems.

14. The method of claim 13, wherein the second element of the telemetry data includes telemetry data that is generated by multiple client systems.

15. The method of claim 13, wherein the second element of the telemetry data includes telemetry data that is generated multiple times by a second one of the client systems.

16. The method of claim 13, wherein in federating the federatable data, the method further comprises combining, by the edge device, the multiple instances of the telemetry data into a common element of telemetry data.

17. The method of claim 11, further comprising providing, by a tagging orchestrator of the data communication network, tagging information to the client systems, wherein the tagging information is based upon the analysis, and wherein the client systems tag the first and second elements based on the tagging information.

18. The method of claim 11, wherein the tagging of the first element and the second element is based upon a condition of the telemetry data.

19. The method of claim 18, wherein the condition includes at least one of a data type, a data class, a data source, a data criticality, a data sensitivity, a data location, a data consumer, a data usage, a target type, a current owner, and a data purgability.

20. A data communication network, comprising:

a plurality of client systems, each client system configured to provide telemetry data to the data communication network, to tag a first element of the telemetry data with first metadata, and to tag a second element of the telemetry data with second metadata, wherein the first metadata indicates that the first element is passthrough data, and wherein the second metadata indicates that the second element is federatable data, and wherein the telemetry data is based on a workload distribution within the client systems an edge device configured to receive the federatable data from each of the client systems, to federate the federatable data into federated data, and to provide the federated data, wherein the federated data is of a smaller quantity than the received federatable data;

a backend system configured to receive the passthrough data from the client systems and to receive the federated data from the edge device, to analyze the passthrough data and the federated data, and to configure the data communication network based upon the analysis; and a tagging orchestrator configured to provide tagging information to the client systems, wherein the tagging information is based upon the analysis, and wherein the client systems tag the first and second elements based on the tagging information.

* * * * *